(12) United States Patent
Tsingas

(10) Patent No.: US 12,669,628 B2
(45) Date of Patent: Jun. 30, 2026

(54) HYBRID SEABED SEISMIC ACQUISITION GEOMETRY USING A COMBINATION OF NODES AND AUTONOMOUS UNDERWATER VEHICLES

(71) Applicant: SAUDI ARABIAN OIL COMPANY, Dhahran (SA)

(72) Inventor: Constantinos Tsingas, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 627 days.

(21) Appl. No.: 18/058,646

(22) Filed: Nov. 23, 2022

(65) Prior Publication Data
US 2024/0168191 A1 May 23, 2024

(51) Int. Cl.
G01V 1/38 (2006.01)
E21B 7/12 (2006.01)
(Continued)

(52) U.S. Cl.
CPC .............. G01V 1/3808 (2013.01); E21B 7/12 (2013.01); E21B 47/001 (2020.05); E21B 47/04 (2013.01); G01V 1/28 (2013.01); G01V 1/3852 (2013.01); G01V 1/282 (2013.01); G01V 1/30 (2013.01); G01V 1/301 (2013.01); G01V 1/303 (2013.01);
(Continued)

(58) Field of Classification Search
None
See application file for complete search history.

(56) References Cited

U.S. PATENT DOCUMENTS 9,013,952 B2    4/2015  Muyzert et al.
10,422,908 B2 *  9/2019  Ray ...................... G01V 1/3852
(Continued)

FOREIGN PATENT DOCUMENTS

WO    2018085567 A1    5/2018
WO    2021162987 A1    8/2021

OTHER PUBLICATIONS

Mancini, Fabio et al., "Low-powered autonomous underwater vehicles for large-scale ocean-bottom acquisition"; First Break; vol. 37, Issue 11; pp. 49-55; Nov. 2019 (7 pages).
(Continued)

*Primary Examiner* — Arleen M Vazquez
*Assistant Examiner* — Leonard S Liang
(74) *Attorney, Agent, or Firm* — Osha Bergman Watanabe & Burton LLP

(57) ABSTRACT

Methods and systems are disclosed. The method includes determining a seismic acquisition grid for a seismic survey, composed of a first receiver grid, a second receiver grid, and a source grid, deploying a first plurality of seismic receivers according to the locations of the first receiver grid, and a second plurality of seismic receivers according to locations of the second receiver grid, and activating a seismic source at location based on the source grid. The method further includes recording a first seismic dataset using the first plurality of receivers and a second seismic dataset using the second plurality of receivers, and generating a velocity model using a velocity analysis method based on the first seismic dataset. The method still further includes forming a seismic image based on the velocity model and the second seismic dataset; and determining a location of a hydrocarbon reservoir based on the seismic image.

14 Claims, 6 Drawing Sheets

(51) Int. Cl.
E21B 47/001 (2012.01)
E21B 47/04 (2012.01)
G01V 1/28 (2006.01)
*G01V 1/30* (2006.01)
*G01V 1/36* (2006.01)

(52) U.S. Cl.
CPC ............... *G01V 1/36* (2013.01); *G01V 1/362* (2013.01); *G01V 1/364* (2013.01); *G01V 1/3835* (2013.01); *G01V 2210/42* (2013.01); *G01V 2210/6222* (2013.01); *G01V 2210/74* (2013.01)

(56) References Cited

U.S. PATENT DOCUMENTS

| | | | | |
|---|---|---|---|---|
| 11,059,552 | B2 | 7/2021 | Rokkan et al. | |
| 2012/0224453 | A1* | 9/2012 | Wu ...................... | G01V 1/3808 367/16 |
| 2014/0043936 | A1* | 2/2014 | Poole ........................ | G01V 1/36 367/21 |
| 2014/0095079 | A1* | 4/2014 | De Cacqueray ....... | G01V 1/364 702/17 |
| 2014/0126781 | A1* | 5/2014 | Poole ..................... | G01V 1/301 382/109 |
| 2015/0316675 | A1 | 11/2015 | Brizard et al. | |
| 2016/0097870 | A1* | 4/2016 | Routh .................... | G01V 1/282 703/2 |
| 2016/0187504 | A1* | 6/2016 | Brenders ................. | G06F 30/00 367/20 |
| 2016/0187507 | A1* | 6/2016 | Brenders .............. | G01V 1/3852 703/2 |
| 2016/0187514 | A1* | 6/2016 | Dellinger ................ | G06F 30/00 367/24 |
| 2016/0202369 | A1* | 7/2016 | Vinje ....................... | G01V 1/28 702/16 |
| 2016/0349394 | A1* | 12/2016 | Lecerf .................. | G01V 1/3808 |
| 2016/0363680 | A1* | 12/2016 | Henin .................... | G01V 1/282 |
| 2017/0059729 | A1* | 3/2017 | Eick ...................... | G01V 1/3808 |
| 2017/0248716 | A1* | 8/2017 | Poole ..................... | G01V 1/282 |
| 2018/0306937 | A1* | 10/2018 | Bagaini ................... | G01V 1/30 |
| 2020/0116885 | A1* | 4/2020 | Abma ................... | G01V 1/308 |
| 2021/0173110 | A1 | 6/2021 | Mancini et al. | |
| 2021/0247534 | A1* | 8/2021 | Bø .......................... | G01V 1/302 |
| 2021/0311220 | A1* | 10/2021 | Eick ......................... | G01V 1/20 |
| 2022/0236435 | A1* | 7/2022 | Ni .......................... | G01V 1/303 |
| 2022/0373705 | A1* | 11/2022 | Krishna ............... | G01V 1/3808 |
| 2023/0022264 | A1* | 1/2023 | Moldoveanu ........... | G01V 1/42 |
| 2023/0084434 | A1* | 3/2023 | Moldoveanu ........ | G01V 1/3808 367/21 |

OTHER PUBLICATIONS

Sabra, Adham, "Cooperative Localisation in Underwater Robotic Swarms for Ocean Bottom Seismic Imaging"; A thesis submitted in partial fulfilment for the degree of Doctor of Philosophy in Robotics; School of Engineering, Robert Gordon University; pp. ii-148; Feb. 2021 (166 pages).

Douillard, A.P. et al., "X027: Derisking Hild Field Development Through Wide-azimuth OBC and Multi-azimuth Streamer Depth Imaging," 71st EAGE Conference & Exhibition, pp. 1-5, Jun. 8-11, 2009 (5 pages).

Moldoveanu, N. et al., "Marine seismic acquisition with autonomous marine vehicles towing 3D sensor arrays," The Leading Edge, vol. 36, No. 7, pp. 558-565, Jul. 1, 2017 (8 pages).

International Search Report issued in corresponding International Application No. PCT/US2023/080678; mailed Mar. 15, 2024 (6 pages).

Written Opinion of the International Searching Authority issued in corresponding International Application No. PCT/US2023/080678; dated Mar. 15, 2024 (7 pages).

* cited by examiner

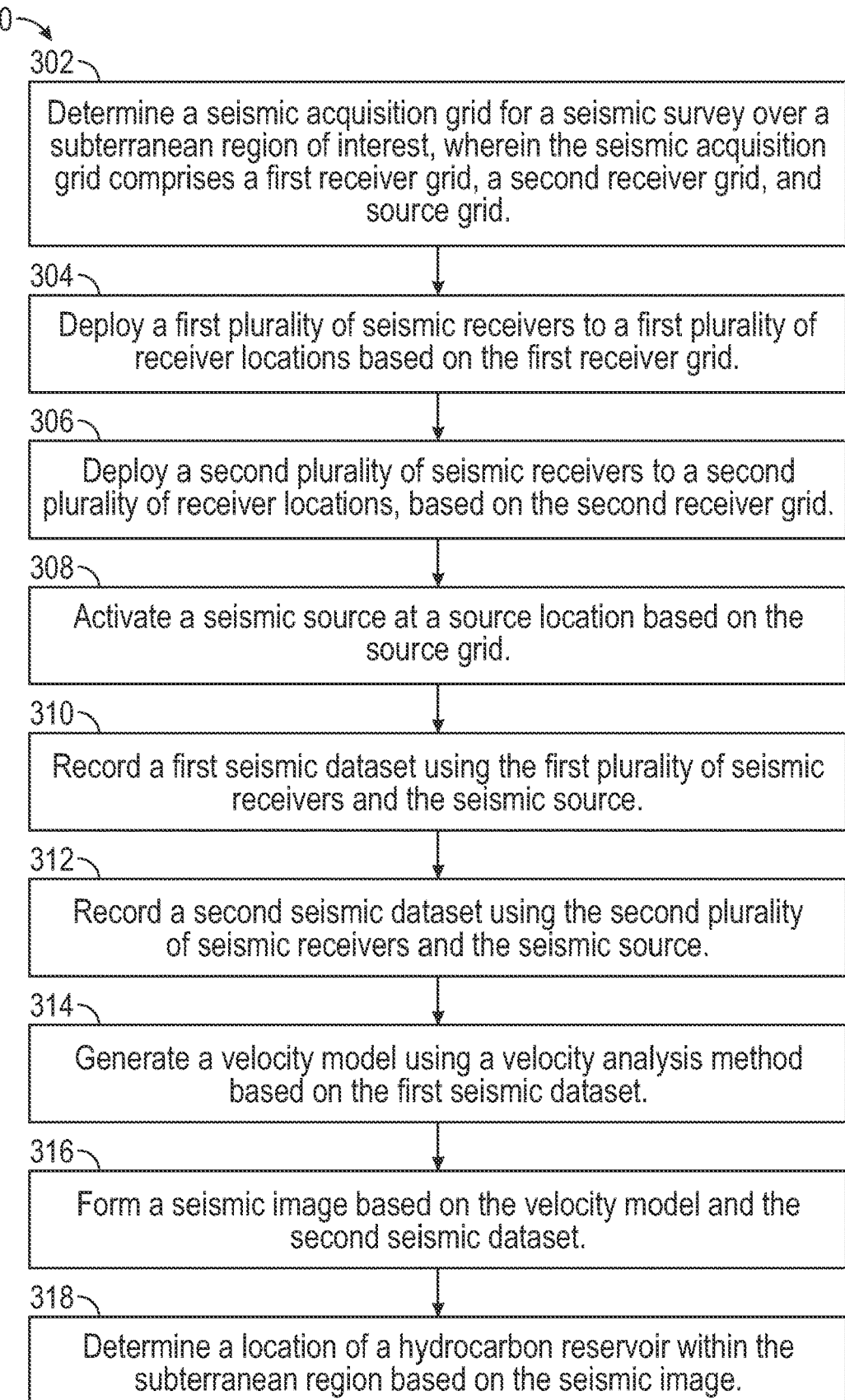

300

302

Determine a seismic acquisition grid for a seismic survey over a subterranean region of interest, wherein the seismic acquisition grid comprises a first receiver grid, a second receiver grid, and source grid.

304

Deploy a first plurality of seismic receivers to a first plurality of receiver locations based on the first receiver grid.

306

Deploy a second plurality of seismic receivers to a second plurality of receiver locations, based on the second receiver grid.

308

Activate a seismic source at a source location based on the source grid.

310

Record a first seismic dataset using the first plurality of seismic receivers and the seismic source.

312

Record a second seismic dataset using the second plurality of seismic receivers and the seismic source.

314

Generate a velocity model using a velocity analysis method based on the first seismic dataset.

316

Form a seismic image based on the velocity model and the second seismic dataset.

318

Determine a location of a hydrocarbon reservoir within the subterranean region based on the seismic image.

FIG. 3

HYBRID SEABED SEISMIC ACQUISITION GEOMETRY USING A COMBINATION OF NODES AND AUTONOMOUS UNDERWATER VEHICLES

BACKGROUND

In the oil and gas industry, seismic surveying is commonly used to investigate subterranean structure and subsequently in the evaluation and location of oil and gas reservoirs. In seismic surveys, a seismic source generates seismic waves that propagate through the subterranean region. The seismic waves reflect and refract from subterranean structures and are subsequently detected by seismic receivers, forming a seismic dataset.

Both seismic survey design and the subsequent processing of the seismic data play important roles in achieving a fit-for-purpose seismic image (i.e., an image of the subsurface), which is commonly used in hydrocarbon exploration and production. Survey design and processing techniques must typically balance seismic imaging goals and economics, which can be challenging in deep water areas with complex geology.

A seismic survey must be processed to produce meaningful images of the subsurface. Two major subcategories of seismic processing are velocity analysis and imaging ("migration"). The survey requirements for velocity analysis and processing may be different. For example, velocity analysis may require larger source receiver offsets than is required for migration. Conversely, migration may require denser receiver imaging than velocity analysis. Thus, there exists a need for a survey deployment system that provides for both sparse, large offset receivers and dense, short offset receivers.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, embodiments relate to a method. The method includes determining a seismic acquisition grid for a seismic survey over a subterranean region of interest, where the seismic acquisition grid is composed of a first receiver grid, a second receiver grid, and a source grid, and deploying a first plurality of seismic receivers to a first plurality of receiver locations based on the first receiver grid and deploying a second plurality of seismic receivers to a second plurality of receiver locations based on the second receiver grid, and activating a seismic source at a source location based on the source grid. The method further includes recording a first seismic dataset using the first plurality of seismic receivers and the seismic source, and recording a second seismic dataset using the second plurality of seismic receivers and the seismic source. The method still further includes generating a velocity model using a velocity analysis method based on the first seismic dataset, forming a seismic image based on the velocity model and the second seismic dataset, and determining a location of a hydrocarbon reservoir within the subterranean region based on the seismic image.

In general, in one aspect, embodiments relate to a non-transitory computer-readable medium having computer-executable instructions stored thereon that, when executed by a processor, perform steps including determining a seismic acquisition grid for a seismic survey over a subterranean region of interest, where the seismic acquisition grid is composed of a first receiver grid, a second receiver grid, and a source grid, and deploying a first plurality of seismic receivers to a first plurality of receiver locations based on the first receiver grid and deploying a second plurality of seismic receivers to a second plurality of receiver locations based on the second receiver grid, and activating a seismic source at a source location based on the source grid. The steps further include recording a first seismic dataset using the first plurality of seismic receivers and the seismic source, and recording a second seismic dataset using the second plurality of seismic receivers and the seismic source. The steps still further include generating a velocity model using a velocity analysis method based on the first seismic dataset, forming a seismic image based on the velocity model and the second seismic dataset, and determining a location of a hydrocarbon reservoir within the subterranean region based on the seismic image.

In general, in one aspect, embodiments relate to a system including a seismic acquisition system, a seismic processing system configured to determine a seismic acquisition grid for a seismic survey over a subterranean region of interest, wherein the seismic acquisition grid comprises the first receiver grid, the second receiver grid, and the source grid, and a seismic interpretation workstation. The seismic acquisition system is configured to deploy a first plurality of seismic receivers to a first plurality of receiver locations based on a first receiver grid, deploy a second plurality of seismic receivers to a second plurality of receiver locations based on a second receiver grid, and activate a seismic source at a source location based on a source grid. The seismic acquisition syste, is still further configured to record a first seismic dataset using the first plurality of seismic receivers and the seismic source, and record a second seismic dataset using the second plurality of seismic receivers and the seismic source. The a seismic processing system is further configured to determine a seismic acquisition grid for a seismic survey over a subterranean region of interest, wherein the seismic acquisition grid comprises the first receiver grid, the second receiver grid, and the source grid, receive the first seismic dataset, receive the second seismic dataset, generate a velocity model using a velocity analysis method based on the first seismic dataset, and form a seismic image based on the velocity model and the second seismic dataset. The seismic interpretation workstation is configured to determine a location of a hydrocarbon reservoir within the subterranean region based on the seismic image.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

FIG. 3 shows a flowchart in accordance with one or more embodiments.

DETAILED DESCRIPTION

Figure 1:
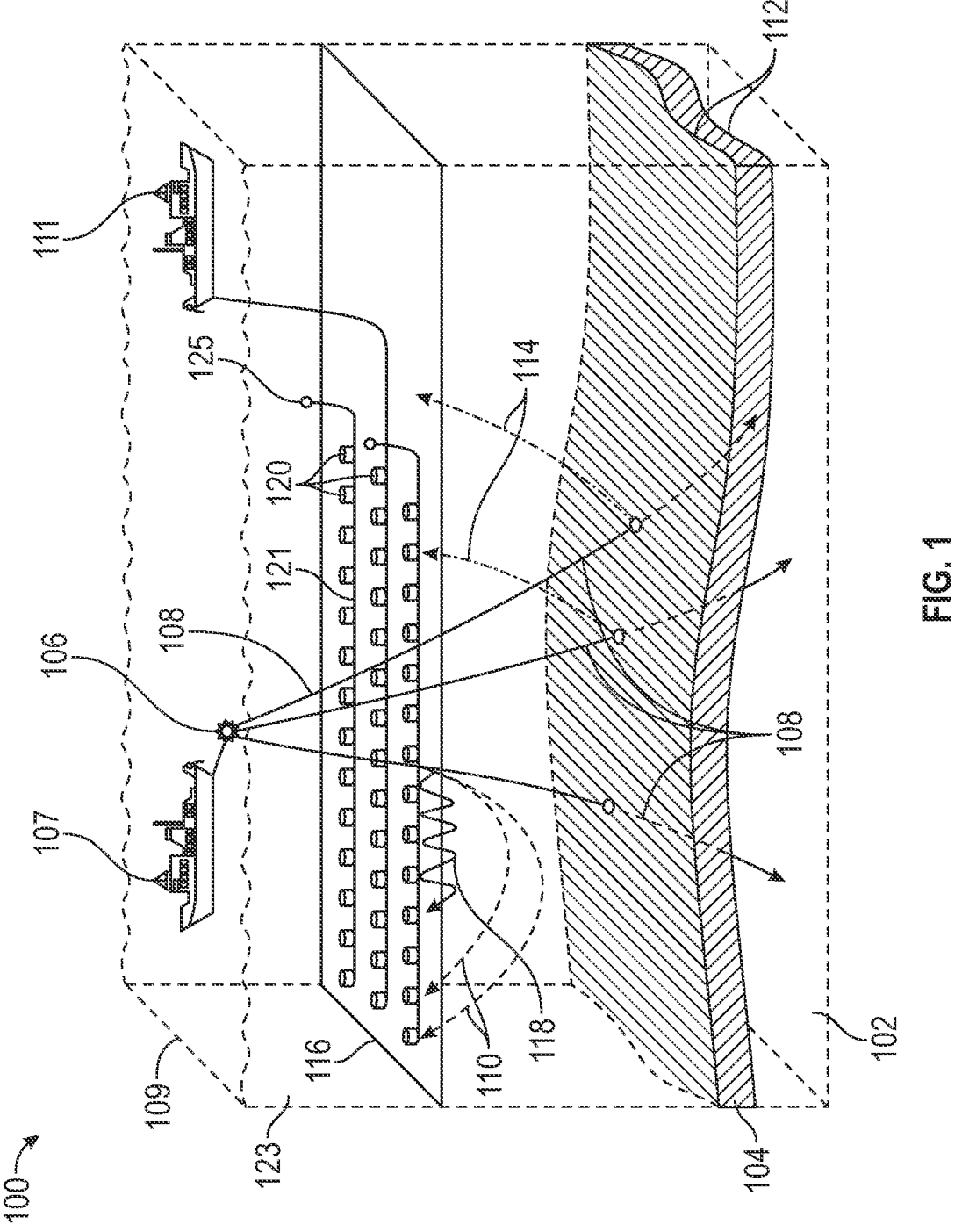
FIG. 1 shows an example of a seismic survey in accordance with one or more embodiments.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements.

In the following description of FIGS. 1-6, any component described regarding a figure, in various embodiments disclosed herein, may be equivalent to one or more like-named components described with regard to any other figure. For brevity, descriptions of these components will not be repeated regarding each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment which may be implemented in addition to, in conjunction with, or in place of the embodiments described with regard to a corresponding like-named component in any other figure.

It is to be understood that the singular forms "a," "an," and "the" include plural referents unless the context clearly dictates otherwise. Thus, for example, reference to "a seismic trace" includes reference to one or more of such seismic traces.

Terms such as "approximately," "substantially," etc., mean that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is to be understood that one or more of the steps shown in the flowcharts may be omitted, repeated, and/or performed in a different order than the order shown. Accordingly, the scope disclosed herein should not be considered limited to the specific arrangement of steps shown in the flowcharts.

Although multiple dependent claims may not be introduced, it would be apparent to one of ordinary skill that the subject matter of the dependent claims directed to one or more embodiments may be combined with other dependent claims.

The ultimate goal of a seismic survey (land and/or marine) is to acquire seismic data which will provide high-resolution and broadband seismic images of the subsurface in a cost-efficient way. In the last couple of decades there have been significant engineering efforts to design and conduct cost-efficient seismic surveys, particularly seabed surveys. One recent development was to automate seismic receiver deployment and retrieval in order to minimize cost and increase productivity. Conventional seabed seismic acquisitions require manual seismic receiver deployment through cabled systems and/or remote operated vehicles (ROVs). This is particularly challenging in sensitive areas with coral reefs, marine infrastructure, and seabed production facilities.

The present disclosure describes a hybrid seismic acquisition configuration using a combination of seabed seismic nodes together with a fleet of autonomous underwater vehicles (AUVs). The seismic data acquired using a hybrid acquisition geometry as described in the present disclosure can be used to achieve high vertical and spatial resolution of geologic formations and an accurate velocity model of the subsurface. Employing AUVs for use in seismic receiver deployment in conjunction with a conventional seabed system using spatially differing survey geometry may result in a cost-effective method to acquire the high-resolution seismic data.

High-resolution seismic data and accurate velocity modeling of the subsurface are critical to producing a reliable seismic image, which is considered an integral component in hydrocarbon exploration and recovery. Seismic interpretation is a task that is routinely performed today, where attributes from the seismic image are analyzed and measured to facilitate the location of new hydrocarbon reservoirs and the maximization of hydrocarbon recovery in known reservoirs.

Disclosed are embodiments describing a method for seabed seismic data acquisition. The method is an improvement over existing methods in that it allows for the economically feasible acquisition of high-quality and fit-for-purpose seismic data. The resulting high-quality seismic image may be used for hydrocarbon reservoir monitoring, exploration, or production. In addition, methods are disclosed for determining and drilling wellbore paths based on the seismic image.

Note that a person of ordinary skill in the art may use "subsurface" and "subterranean" synonymously. Herein, we follow this practice and the terms subsurface and subterranean may be used interchangeably as appropriate without departing from the scope of the present disclosure.

FIG. 1 shows an example of a seismic survey (100) of a subterranean region (102) containing a hydrocarbon reservoir (104). The seismic survey (100) may use a seismic acquisition system to generate and record seismic data. The seismic acquisition system may include one or more seismic sources (106) that generate radiated seismic waves (108). In a land environment, the seismic source (106) may be a dynamite source or one or more seismic vibrators (e.g., a "vibroseis truck"). In a marine or lacustrine environment, the seismic source (106) may be an air gun towed by a source vessel (107) just below the sea surface (109). The seismic acquisition system may also include a plurality of seismic receivers (120), by which the radiated seismic waves (108) may be recorded. A single activation of the seismic source (106) may be recorded by tens or hundreds of thousands of seismic receivers (120). Typically, in a land environment, each seismic receiver (120) may record the velocity or acceleration of ground motion (e.g., a "geophone" or "accelerometer") at each receiver location, while in a marine or lacustrine environment, each seismic receiver (120) may record pressure fluctuations caused by the seismic waves (e.g., a "hydrophone") at each receiver location.

In a "multicomponent" land seismic survey, two or three mutually orthogonal geophones or accelerometers may be implemented per receiver location to detect ground motion in two or three directions. A multicomponent seismic receiver typically records one trace per component, and the seismic data generated from a multicomponent seismic survey may be referred to as a three-component (3C) seismic dataset. In marine or lacustrine environments, each receiver location may further include a hydrophone to record changes in pressure. This four-component (4C) seismic receiver which will record four traces per receiver location, producing a 4C seismic dataset.

Further, a seismic acquisition system used for a marine environment may be a towed streamer acquisition system. That is, one or more recording vessels (111) may each tow a set of cables (121), each cable (121) containing a plurality of seismic receivers (120) (i.e., hydrophones). In other embodiments, the marine environment may also use an ocean bottom seismic ("OBS") acquisition system. That is, the seismic receivers (120) may be placed at the bottom of the water layer (123) coupled to the seafloor (116) and may also be multicomponent seismic receivers.

The seismic receivers (120) used in OBS surveys may be referred to as "nodes", and in this case the OBS survey may be specifically referred to as an ocean bottom node ("OBN") seismic survey. In an OBN survey, a plurality of nodes may be physically independent of one another, or, the plurality of nodes may be connected by a passive rope. The passive rope is a purely physical connection that may be implemented for ease of deployment and retrieval of the nodes. That is, each of the plurality of nodes may be equipped with a battery that may require charging throughout the seismic survey (100). However, in some embodiments, a plurality of nodes may be connected by a cable (121), and the cable may contain electrical wires used for power distribution and data telemetry. This type of acquisition configuration is typically referred to as an ocean bottom cable or "OBC" seismic survey, which is the specific type of seismic survey (100) shown in FIG. 1.

In FIG. 1, each cable (121) of receivers (120) may be deployed to the seafloor (116) by a recording vessel (111), line by line. The cables (121) may be attached to a recording vessel (111) that pulls the cables into place, or the cables (121) may be placed individually at a desired location or in series using a buoy (125). The buoy (125) may be coupled to the end of each cable (121) to aid in the retrieval of the cable/nodes. That is, the buoy (125) may be a pop-up buoy that receives a signal from a retrieval vessel to pop up or float to the sea surface (109), where the cable (121) (or the rope in some OBN surveys) is then pulled onto the retrieval vessel using a mechanical winch and reel system.

Once the seismic source (106) is activated, radiated seismic waves (108) may propagate through the water layer (123), then along the seafloor (116) as surface seismic waves (118). The radiated seismic waves (108) may also propagate below the seafloor (116) and return as refracted seismic waves (110) or may be reflected one or more times by geological discontinuities (112) and return to the seafloor as reflected seismic waves (114). In general, radiated seismic waves (108), surface seismic waves (118), refracted seismic waves (110), and reflected seismic waves (114), may be referred to as simply "seismic waves." Further, in a multicomponent seismic survey, seismic receivers (120) may detect two types of seismic waves, one type is often termed primary wave, or P-waves, and a second type, shear waves, often termed secondary waves, or S-waves. Multicomponent seismic receivers (120) allow for the determination of both the type of seismic wave and its direction of propagation.

In some embodiments, the seismic waves generated by a single activation of the seismic source (106) are received by the seismic receivers (120) and recorded, using a recording system, as a time-series representing the amplitude of ground-motion and/or pressure fluctuations at a sequence of discrete times. This time-series may be denoted a seismic "trace." In other embodiments, the seismic waves generated by a plurality of activations of the seismic source (106) at a single location may be recorded by each seismic receiver (120) and combined, summed, or "stacked" to form a seismic trace. Further, a series of adjacent traces may exhibit a coherent pattern from a recorded wave response of a geological discontinuity (112) and may be referred to as a seismic "event." For example, the seismic event may represent a recorded reflected wave. In an OBN survey, the seismic receivers (120) (i.e., nodes) may either send the time-series data to a recording vessel (111) or the data may be stored directly by the seismic receiver (120) requiring retrieval for later analysis.

There are several advantages to OBS acquisition compared to towed streamer style acquisition. For example, in OBS acquisition, the seismic data collected is typically less affected by noise (unwanted recorded data) than in streamer acquisition where the seismic receivers (120) are exposed to surface factors such as weather, waves and swells. OBS acquisition systems typically employ multicomponent sensors, which record multiple data components as well as S-wave data. S-wave data can be important for imaging gas reservoirs in the subsurface. That is, while P-wave data may be absorbed by gas reservoirs, obscuring the resulting seismic image, S-waves on the other hand are less absorbed and may propagate through the rock matrix giving information about the reservoir. For example, when anisotropy is present, S-waves will split into two waves providing information about fracture density and orientation, which may be very helpful in finding carbonate reservoirs. Amplitude anomalies will also help determine the presence of hydrocarbons and other subsurface lithologies. S-wave data is not recorded in towed streamer acquisition where only hydrophones are employed as seismic receivers (120).

Another benefit of OBS acquisition over towed streamer acquisition is the flexibility in survey design and acquisition. For example, towed streamers may be limited by surrounding infrastructure and geography as the recording vessel is typically towing several kilometers of streamers. Efforts to avoid obstructions using sharp turns may result in tangled streamers or running the boat aground. Ocean bottom cables (and nodes), however, can work around these obstructions and in and around exclusion zones. Further, in an OBS survey, an advantage over towed streamers is the flexibility of survey design. Detached receivers may allow for full-azimuth data, depending on source locations. The azimuth refers to the angle between the source and the receiver, typically measured clockwise from North. For example, towed streamer is a narrow-azimuth survey, since due to the configuration of the towed source and towed receivers, the range of angles between all sources and receivers are small, or narrow. Full-azimuth surveys refer to surveys where the angles between sources and receivers range from 0 to 360 degrees. Wide-azimuth surveys may have azimuths from 0 to 180 degrees. Full-azimuth seismic surveying offers improved imaging for many subsurface features such as fault definition or sub-salt imaging. Lastly, OBS surveying also allows for the ability to use longer offsets, which may result in improved imaging of deeper seismic horizons.

Conversely, the disadvantages of OBS over towed streamer acquisition are largely economical. For example, towed streamer acquisition may offer better coverage at higher speeds of acquisition than OBS acquisition. This may be due, in part, to the deployment and retrieval of seismic receivers (120). That is, unlike OBS surveying, towed streamer does not require seismic receivers being placed or dragged into place on the seafloor (116). Deployment can be time-consuming, especially in deeper water environments, and may require extra equipment and/or vessels. Further, in an OBN survey, nodes are typically bulkier and heavier than cables. In some cases, nodes must be placed on and retrieved from the seafloor (116) by ROVs, which are typically slow to operate, increasing the cost of the operation.

OBN acquisition has its advantages over OBS acquisition. For example, the removal of the need for power distribution and data telemetry (via cables (121) allows for complete freedom in the spacing between seismic receivers (120) and allows for more receiver stations to be deployed. The removal of connectors and terminations in nodal acquisition versus cabled acquisition has resulted in improvements in reliability of receivers. Another example of an advantage of OBN acquisition over OBC acquisition is that OBC acquisition is limited by the length of the cables (121). That is, OBN surveys may be used to acquire seismic data in deeper water than OBC surveys, which is critical for deep-water drilling.

AUVs are unmanned underwater robots that can travel through water without input from an operator. Unlike ROVs, which are tethered to a vessel, AUVs have no physical connection to their operator. Rather, AUVs are programmed or controlled by operators who may be on a vessel (or even on shore), who tell an AUV where to move, and when. AUVs may be configured to carry a variety of equipment, such as seismic receivers (120), cameras, sonar, or depth sensors. Unlike ROVs, which transmit video via their tethers almost instantaneously to a control room on a vessel, an AUV stores all data, including images and recorded seismic data, on onboard computers until it can be downloaded after retrieval or demobilization.

Turning back to FIG. 1, the seismic receivers (120) are positioned at a plurality of seismic receiver locations which we may denote $(x_r, y_r)$ where x and y represent orthogonal axes on the seafloor (116) above the subterranean region (102). Thus, the refracted seismic waves (110), surface seismic waves (118), and reflected seismic waves (114) generated by a single activation of the seismic source (106) may be represented as a three-dimensional "3D" volume with axes $D(t, x_r, y_r)$, where $(x_r, y_r)$ represents the location of the seismic receiver (120) and t denotes the time-series at which the amplitude of ground-motion was measured. However, a seismic survey (100) may include recordings of seismic waves generated by a seismic source (106) that is positioned at a plurality of seismic source locations denoted $(x_s, y_s)$. Thus, the seismic volume for a seismic survey (100) may be represented as a five-dimensional volume, denoted $D(t, x_r, y_r, x_s, y_s)$, where $(x_r, y_r)$ are vectors of seismic receiver locations along the x- and y-axes, and $(x_s, y_s)$ are vectors of seismic source locations along the x- and y-axes.

The data collected by the seismic receivers (120) is referred to as a seismic dataset. A seismic dataset must be processed to produce valuable information, such as one or more seismic images or one or more seismic attributes. Seismic processing may be done using a seismic processing system and seismic processing typically includes subcategories such as pre-processing, noise attenuation, near-surface corrections, velocity analysis, imaging, and attribute generation. When processing a multicomponent seismic dataset, it is frequently desirable to process each recorded component separately as each receiver component may record a cartesian component of ground motion or a different wave type. Various wavefield separation techniques exist and may include polarization analysis, frequency-wavenumber filtering, or array-forming.

Pre-processing may include sorting (e.g., "demultiplexing") and organizing the data (e.g., "sorting") including integrating the seismic data with geometry and navigation data describing the locations of seismic sources and receivers at the time the seismic data was recorded. The seismic dataset may be sorted and grouped into "gathers" such as common shot or common receiver gathers, according to the spatial coordinates of seismic sources (106) and receivers (120), respectively. In some embodiments, the seismic volume may be sorted and grouped based on a common domain, such as a common midpoint $$(x_m, y_m) = \frac{(x_s, y_s) + (x_r, y_r)}{2},$$

where $(x_s, y_s)$ corresponds to a position of a seismic source (106) location, and $(x_r, y_r)$ corresponds to a position of a seismic receiver (120).

A process called "stacking" typically involves summing adjacent traces within a common midpoint (CMP) gather. Stacking is commonly performed after applying moveout correction, which is a process that compensates for the delay in reflection arrival times caused by variations in offset (the distance between source (106) and receiver (120) locations). Before stacking, the dataset is referred to as a "pre-stack" seismic dataset, whereas once the CMP gathers (or any form of gathers) are stacked, the dataset is called a "post-stack" seismic dataset. Another example of a common domain is the common offset domain, where offset= $\sqrt{(x_s-x_r)^2+(y_s-y_r)^2}$.

Further, pre-processing may include removing recordings from malfunctioning receivers ("trace editing"), seismic wavelet estimation, correcting amplitudes for geometrical-spreading effects, and deconvolution (e.g., "predictive deconvolution") to remove undesirable ringing caused by the recording system or the layered structure of the earth.

Seismic noise may include both coherent source-generated and random noise. For example, coherent source-generated may include ground- and mud-roll and both short- and long-period multiple reverberation from the earth. Random noise may include wind or ocean-swell induced noise, anthropogenic noise from nearby machinery (e.g., pumps) or traffic, and may include interference from seismic surveys being conducted in adjacent areas. Noise attenuation may include high-cut filtering of high-frequency noise, removal of surface seismic waves ("ground-roll") and other linear-propagating noise using frequency-wavenumber (e.g., "f-k" or "tau-p") filtering, and multiple attenuation.

Near-surface corrections may include correcting for "ghosts" (e.g., de-ghosting) caused by the proximity of the surface of the earth or sea surface (109) to the seismic sources and receivers, and for near-surface seismic wave propagation velocity and attenuation effects (e.g., "statics correction"). In marine seismic surveys, near-surface corrections may include water layer (123) corrections such as water column statics or tidal statics.

Acquisition regularization may include compensating for irregularities in spatial sampling during seismic data acquisition. Obstacle avoidance, economics and other external factors may affect the trace spacing across a seismic survey. Acquisition regularization includes basic or advanced interpolation techniques to create uniformly sampled seismic data from irregularly-acquired seismic data.

In order to determine the correct location of reflectors within the subsurface and generate images of geological structure and seismic attributes, it is necessary to determine the seismic wave propagation velocity (a "velocity model") at points within the subsurface region of interest. A velocity model may be determined from in-situ measurements, i.e., in a wellbore and/or from the seismic data itself using a process called "velocity analysis." Various velocity analysis methods are available each with their own computational cost and accuracy characteristics. Velocity analysis may include processes such as "normal-moveout estimation," "tomography," and "full waveform inversion," or frequently, a combination of these methods all of which are familiar to a person of ordinary skill in the art.

Full waveform inversion (FWI) is velocity analysis method used to generate highly detailed data-driven models of subsurface velocity (e.g., velocity models). FWI iteratively minimizes a residual, the residual being the difference between the recorded seismic waves and modeled synthetic seismic waves. The modeled synthetic seismic waves are generated from an estimated velocity model. FWI typically focuses on refracted seismic waves (110) but may also use reflected seismic waves (114) and may perform better with low-frequency, long offset seismic data. The attenuation of seismic waves in the subsurface is proportional to frequency; that is, the higher-frequency components of a propagating seismic waves is attenuated more than its lower-frequency components. Also, long offset seismic data provides information about deep reflectors in the subsurface. Further, a variation in offset direction (i.e., azimuth) may give anisotropy information, which may also be required to build an accurate velocity model. Due to these characteristics, OBN seismic data is typically an excellent candidate for generating high-quality and accurate velocity models using FWI.

FWI may be very computationally intensive, therefore technological advancements are continually being made in order to reduce computational requirements and time, not only in software and hardware, but also in the application of FWI algorithms. For example, the entire seismic dataset from a dense seismic survey (100) may not be required to produce an accurate velocity model, and thus the seismic data is typically be decimated (i.e., the removal of seismic traces) to reduce computational requirements. As an example, decimation may be done in the common channel domain and/or in the shot domain. The decimation in the common channel domain may be regular (e.g., removing every other trace within a shot gather), whereas the decimation performed in the shot domain may be irregular (randomized) and may also be more aggressive than the common channel domain decimation. That is, data prepared for use in FWI may be sparsely and irregularly spaced.

Once a velocity model has been determined, an image of seismic wave reflection or scattering may be determined using a method termed "migration." As with velocity analysis, there are various methods of migration familiar to a person of ordinary skill in the art, each with its own computation cost and accuracy characteristics. For example, in order of increasing cost and accuracy, migration methods include Kirchhoff time migration, Kirchhoff depth migration, reverse-time migration (RTM), and least-squares reverse-time migration (LSRTM). In each case a migration method aims to position a signal recorded by a seismic receiver at the location in the surface from which it was scattered or reflected.

RTM is a high-accuracy high-computational cost wave-equation based migration method. It is commonly used to image in and below areas with great structural and velocity complexity, such as the combination of steep structural dip and high velocity contrast (e.g., sedimentary areas with steep salt inclusions). Traditional one-way full wave migration methods may perform imaging by extrapolating the data in depth, whereas RTM, a two-way full wave migration method, solves the wave equation forward in time for the source-modeled field and backwards in time for the recorded receiver field for each shot gather. At each time step, the seismic image may be obtained by cross-correlating the two fields.

RTM may be used to form a final seismic image but may also be used to form intermediate seismic images used in refining structural boundaries during the iterative process of velocity model building. RTM is typically associated with high computational costs, where runtime may be dependent on frequency output, and therefore is commonly used to image low frequencies (e.g., <45 Hz). Thus, it is favorable to use seismic data with high signal-to-noise low frequencies, such as OBS-acquired seismic data. Further, the full-azimuth characteristics of OBS seismic data may produce more accurate seismic images, especially when coupled with a high-quality velocity model (e.g., a velocity model generated using FWI methods) and frequency extension methods such as LSRTM.

Least-square migration is a method to improve upon an existing migrated seismic image by minimizing the difference between de-migrated synthetic data and recorded seismic data. When least-square methods are applied to an RTM seismic image it may be referred to as LSRTM. LSRTM is an inversion method that may improve an RTM seismic image by reducing migration artifacts, increasing spatial resolution, improving amplitude balancing, and improving the imaging of steep dips and complex structures. For example, LSRTM may be used to improve the resolution in shallower areas as well as poorly illuminated deeper areas (e.g., subsalt). In other words, the least-square inversion method acts as a de-blurring mechanism, typically leading to a higher resolution seismic image. The method is commonly implemented as an iterative method but may be performed in a single step using a matching filter as an approximate solution.

Seismic processing may produce a number of 3D images from the seismic data representing different "attributes" of the seismic data. For example, an image of the total amplitude of scattering at each point in the subsurface may be generated. Similarly, the amplitude of scattering within a restricted range of angles may be calculated. Alternatively, the mean, median or mode of the spatial- or temporal-frequency of scattered seismic waves at each point may be imaged. In still other cases, the seismic propagation velocity or seismic propagation attenuation may be used as a seismic attribute.

Although described for convenience above as a linear sequence of steps, a person of ordinary skill in the art will understand that each step of the seismic processing chain is subject to review and quality control (QC) steps of an automatic, statistical, and/or manual nature. For this reason, among others, some seismic processing steps may be repeated immediately or at a later point in the sequence, to produce an improved, refined, or updated result. For example, the seismic velocity model may be updated after an initial migration has been performed. Similarly, additional temporal-frequency filtering may be inserted into the sequence at numerous points.

Several of these steps, such as seismic imaging and seismic attribute attenuation, require further interpretation to identify the locations within the subsurface at which hydrocarbon accumulations may be present. In some embodiments, the interpretation may occur after the generation of a post-stack seismic image or the seismic attribute. In other embodiments, the interpretation may be performed in parallel or interleaved or integrated into the process of determining the post-stack seismic image or the seismic attribute. Seismic interpretation will be discussed in more detail later.

Figure 2A:
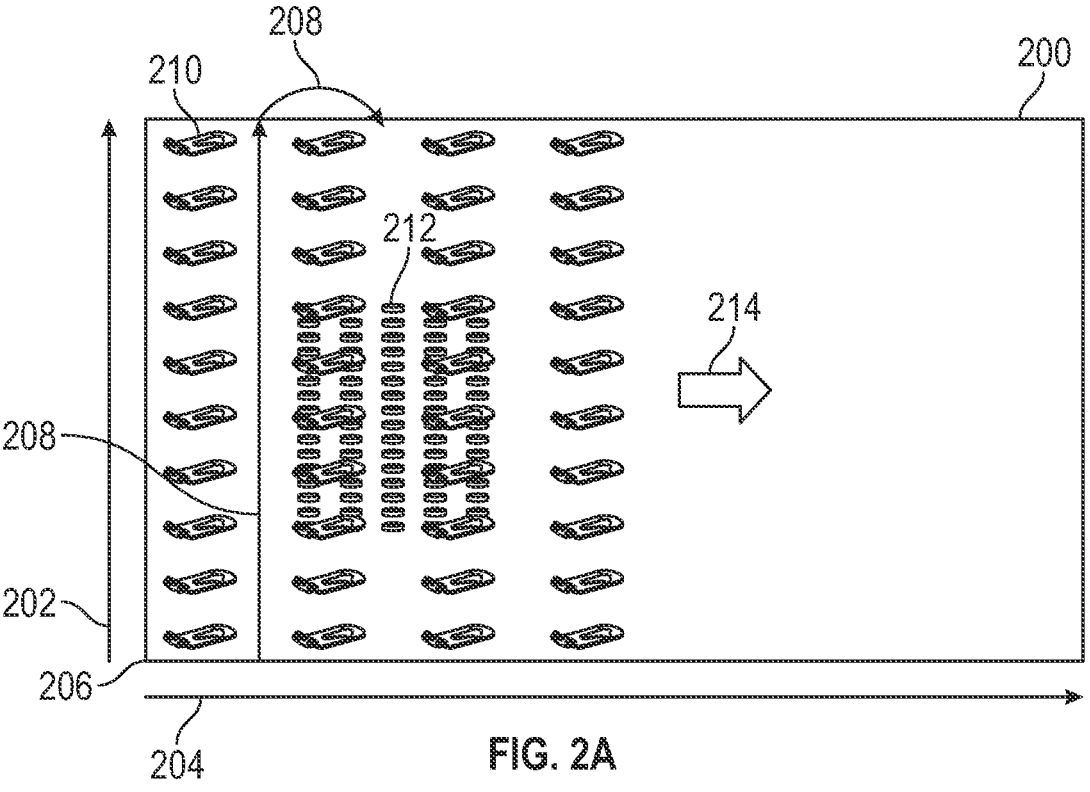
FIGS. 2A and 2B show examples of seismic survey arrangements in accordance with one or more embodiments.
Figure 2B:
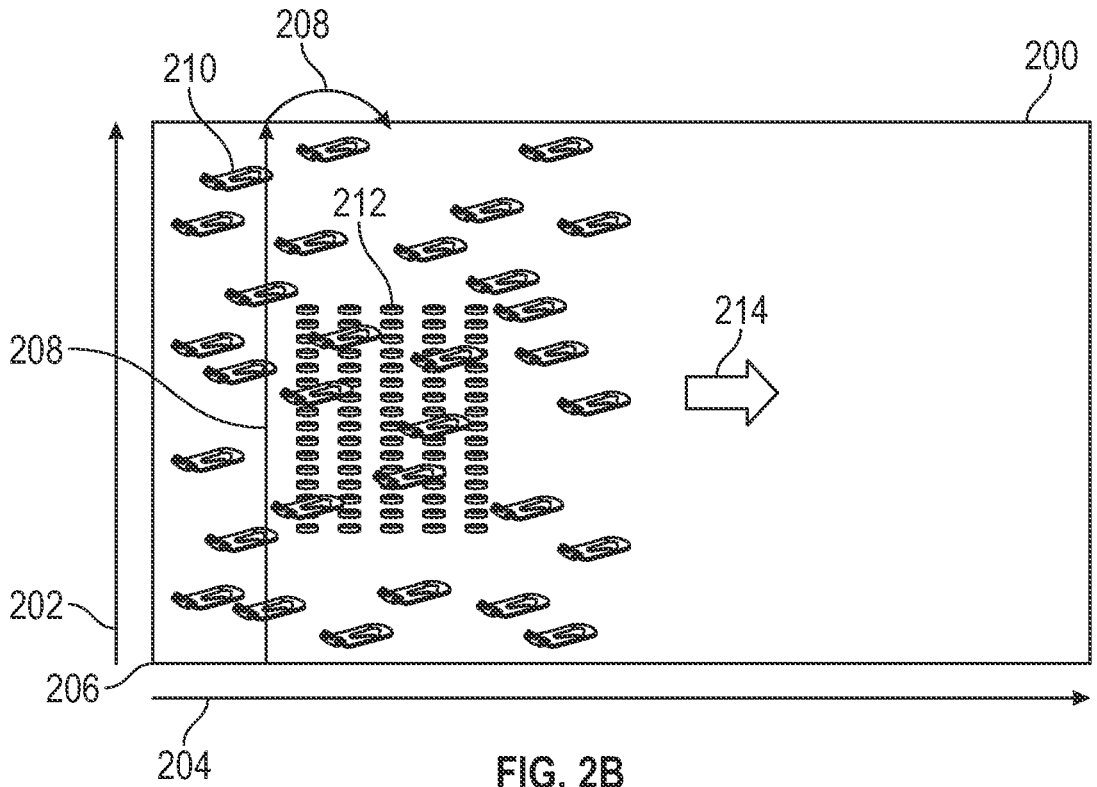

FIGS. 2A and 2B show examples of seismic survey arrangements in accordance with one or more embodiments. A seismic survey arrangement or design may be based on various factors such as subsurface target depth, survey area, logistics, and spatial sampling (or desired resolution). Steeply dipping subsurface structure can be difficult to image with seismic, with deeper targets requiring longer offset seismic data than shallower targets. Economics, permitting, weather, physical obstructions, environmental factors, and equipment availability must also be considered in seismic survey design. Also, in order to properly sample a seismic waveform, there must be at least two recorded samples per wave cycle otherwise aliasing (frequency distortion) may occur at the frequency related to the wave cycle, therefore adequate sampling must be considered in the survey geometry definition.

Seismic survey design may include seismic acquisition geometry information, typically defined by a seismic acquisition grid. A seismic acquisition grid covers the entire spatial area of a seismic survey, the seismic survey being subdivided into cells or "bins" of the seismic grid. The dimensions of each bin within the seismic grid are commonly of the order of 25 m×25 m, but bin size and shape may vary (for example, bins may also be rectangular), depending on the design of the seismic survey. A seismic acquisition grid may be used in processing and termed a "processing grid." Seismic traces are often assigned to bins based on their midpoint ("CMP binning"), but other forms of binning may be used for more sophisticated seismic processing. The number of traces assigned to a CMP bin is referred to as the "fold." The traces within a bin are commonly stacked, and typically, the higher the fold, the higher the signal-to-noise ratio of the post-stack seismic data.

A grid may defined by parameters such as: a set of coordinates including an origin, defined by an x-y coordinate pair within a coordinate system; an azimuth, the orientation of the grid with respect to the coordinate system typically measured in degrees; the bin dimensions; and the number of bins. The natural CMP interval (and therefore the CMP bin dimensions of a seismic acquisition grid) is a function of the source and receiver intervals, also determined by the seismic survey design. That is, the seismic acquisition grid may include related survey geometry information such as a source grid or a receiver grid. A source grid may define source locations at which a seismic source should be activated. The source grid may also define the interval at which the source should be activated (the "shot interval"), the direction the source vessel (107) should travel, and the interval between shot lines or "sail lines." The source vessel (107) typically travels in a straight line or along a sail line from one edge of the survey to the other before executing a 180-degree turn to sail along another shot line. Further, the source vessel (107) may travel in a particular pattern across the seismic survey (100), for example, in a "race-track" pattern.

A receiver grid may define a plurality of receiver locations to which seismic receivers (120) are to be deployed. The receiver grid may also define the spatial sampling of the receivers, that is, the receiver interval and the distance between receiver lines. In some embodiments, multiple source grids or multiple receiver grids may be defined. The survey design may divide the full seismic survey into pieces ("patches"), relating to offset or azimuth requirements, indicating a portion of the seismic receivers (120) require repositioning. The repositioning of seismic receivers (120) may require a pause in acquisition; however, in some embodiments, the repositioning of some seismic receivers (120) may be done in real-time using AUVs.

Turning back to FIGS. 2A and 2B, the seismic survey arrangements each show a seismic acquisition grid (200) with vertical axis (202) representing increasing y-coordinate and horizontal axes (204) representing increasing x-coordinate, each axis extending from the grid origin (206). In both FIGS. 2A and 2B, the source vessel (107) path is indicated by the set of arrows (208); that is, a sail line that is parallel to the vertical axis (202) of the seismic acquisition grid (200). The source vessel paths shown in FIGS. 2A and 2B are examples and are not meant to be limiting to the present disclosure. That is, a source vessel path may be perpendicular or diagonal to the one shown in FIGS. 2A and 2B, or may be any source vessel path known to one ordinarily skilled in the art.

The source may activate at source locations defined by the source grid (not shown), producing seismic waves that will radiate through the water layer (123), reflect, and/or refract, and be recorded by seismic receivers (120) positioned at a first plurality of AUV receiver locations (210), and a second plurality of nodal receiver locations (212). That is, AUVs may be used to position seismic receivers (120) at AUV receiver locations (210), while more densely spaced nodes may be positioned at nodal receiver locations (212). In some embodiments, the nodes may be attached via cables (121) (i.e., OBC acquisition), or may be physically attached using rope or wire (i.e., OBN acquisition).

In FIGS. 2A and 2B, the nodal receiver locations (212) may be regularly spaced at a typical OBN receiver interval. In FIG. 2A, the AUV receiver locations (210) are regularly spaced and are defined at sparser intervals than the nodal receiver locations (212). FIG. 2B shows an example of irregularly spaced or randomized sparse AUV receiver locations (210). In some embodiments, the seismic receivers (120) positioned at the AUV receiver locations (210) may record a first seismic dataset used in velocity analysis, while the seismic receivers (120) positioned at nodal receiver locations (212) may record a second seismic dataset used to form a seismic image.

The number of AUV receiver locations (210) and nodal receiver locations (212) illustrated in FIGS. 2A and 2B are for demonstrative purposes only and are not meant to limit the present disclosure. In some embodiments, AUVs may be used to move seismic receivers (120) from a first plurality of receiver locations to another (i.e., a third) plurality of receiver locations in real-time; that is, without pausing the acquisition. The nodal receiver locations (212) shown in both FIGS. 2A and 2B may be considered a first patch of nodal receiver locations (212) and may require relocation to a second patch of nodal receiver locations, in the survey acquisition direction indicated by the thick arrow (214). In further embodiments, AUVs may move seismic receivers (120) from a first patch of AUV receiver locations (210) to a second patch of AUV receiver locations in real-time; that is, without pausing the acquisition.

FIG. 3 shows a flowchart in accordance with one or more embodiments. In step 302 of flowchart (300), a seismic acquisition grid for a seismic survey (100) over a subterranean region (102) of interest is determined, in accordance with one or more embodiments. The seismic survey (100) may be performed using a seismic acquisition system. The seismic survey may be planned to be conducted on a marine surface, i.e., the seismic survey may be a "marine" seismic survey. The seismic acquisition grid may include a first receiver grid, a second receiver grid, and source grid. The first receiver grid may define a first plurality of receiver locations. In some embodiments, the first plurality of receiver locations may be irregularly spaced (e.g., randomized). The second receiver grid may define a second plurality of receiver locations. In other embodiments, the second plurality of receiver locations may be spatially dense relative to the first plurality of receiver locations.

In step 304, a first plurality of seismic receivers is deployed to a first plurality of receiver locations based on the first receiver grid, in accordance with one or more embodiments. In some embodiments, at least one of the first plurality of seismic receivers is deployed using an AUV. That is, a single AUV may carry one or more seismic receivers (120) at a time, or the same AUV may be used to deploy multiple individual seismic receivers (120). In some embodiments, the first plurality of seismic receivers may be deployed to a first plurality of AUV receiver locations (210) as described in FIGS. 2A and 2B.

In other embodiments, the first plurality of seismic receivers may be retrieved using an AUV and the first plurality of seismic receivers may be repositioned to a third plurality of receiver locations based on the first receiver grid. That is, the seismic survey may be acquired in patches. In further embodiments, the first plurality of seismic receivers may be retrieved using an AUV and then a portion of a first seismic dataset may be downloaded to a seismic processing system. Further, while the first plurality of seismic receivers is retrieved and on board a retrieval vessel (which may be the same as the recording vessel), the batteries may be recharged, if required.

In step 306, a second plurality of seismic receivers is deployed to a second plurality of receiver locations based on the second receiver grid, in accordance with one or more embodiments. The second plurality of seismic receivers may be regularly spaced according to positions defined by the second receiver grid. The second plurality of seismic receivers may be deployed using an OBC or OBN acquisition system. Further, the second plurality of seismic receivers may be nodes, and may be physically connected using a wire or rope. In other embodiments, the nodes may not be connected with wire or rope or may be positioned by ROVs. In some embodiments, the second plurality of seismic receivers may be deployed to a second plurality of nodal receiver locations (212) as described in FIGS. 2A and 2B. In further embodiments, the second plurality of seismic receivers may be retrieved for recharging, and/or to download a portion of a second seismic dataset to the seismic processing system.

In step 308, a seismic source is activated at a source location based on the source grid, in accordance with one or more embodiments. The seismic source may be towed by a source vessel (107) as shown in FIG. 1. The source vessel may follow a source vessel path and may activate its seismic source at a particular interval or at predefined source locations as described in FIGS. 2A and 2B.

In step 310, a first seismic dataset is recorded using the first plurality of seismic receivers and the seismic source, in accordance with one or more embodiments. The first seismic dataset may be recorded using an OBN seismic acquisition system via a seismic survey (100), such as the one described in FIG. 1.

In step 312, a second seismic dataset is recorded using the second plurality of seismic receivers and the seismic source, in accordance with one or more embodiments. The second seismic dataset may be recorded using an OBN or OBC seismic acquisition system via a seismic survey (100), such as the one described in FIG. 1.

In step 314, a velocity model is generated using a velocity analysis method based on the first seismic dataset, in accordance with one or more embodiments. The velocity analysis method may include FWI or any other method familiar to one of ordinary skill in the art.

In step 316, in accordance with one or more embodiments, a seismic image is formed. The seismic image is formed based on the velocity model and the second seismic dataset. The second seismic dataset may be pre-processed before being used in migration. In some embodiments, the velocity model may be used in pre-processing. The velocity model may also be used in migration, which may be an LSRTM, or any other migration algorithm known to those of ordinary skill in the art. That is, the seismic image may be a migrated seismic image. The migrated seismic image may be further processed, the processing steps typically referred to as "post-processing." Post-processing may include frequency filtering, amplitude balancing, noise attenuation, or dip filtering.

In step 318, in accordance with one or more embodiments, a location of a hydrocarbon reservoir (104) within the subterranean region (102) may be determined based on the seismic image. The seismic image or its attributes may be used to determine geological properties in order to locate the hydrocarbon reservoir (104). The process of determining geological properties from a seismic image or seismic attribute image is called seismic interpretation. For example, identifying a discontinuity in an otherwise continuous surface of high amplitude seismic reflections as a geological fault, or identifying a region with anomalously high seismic wave attenuation as indicative of a hydrocarbon gas deposit, are examples of seismic interpretations.

Seismic interpretation may include manual steps, such as "picking" a sparse set of points on a single interpreted undulating geological boundary, and automatic or algorithmic steps, such as picking all the remaining grid points, intervening between the manually picked points, lying on the boundary using the manually picked points as a guide or "seeds."

Often, the output of seismic interpretation includes the seismic image, or attribute image, with the interpretation of labelled geological boundaries, faults, well markers, pore fluid contact levels, gas deposits etc., drawn and annotated on the image. In the past, such interpretation was performed using displays of portions of the seismic image printed on paper with the interpretation drawn, originally hand-drawn, on the paper using colored pen or pencils. Now, a seismic interpreter of ordinary skill in the art will, almost without exception, use a seismic interpretation workstation to perform seismic interpretation.

A seismic interpretation workstation may include one or more computer processors and a computer-readable medium (memory) containing instructions executable by the processor. The computer memory may further contain seismic images and/or seismic attributes. The seismic interpretation workstation may also include a display mechanism, usually one or more monitor screens, but sometimes one or more projector, user-wearable goggles or other virtual reality display equipment and a means of interacting with the display, commonly a computer mouse or sometimes a wand. Further, the seismic interpretation workstation may include dedicated hardware designed to expedite the rendering and display of the seismic image, images, or attributes in a manner and at a speed to facilitate real-time interaction between the user and the data. For example, the seismic interpretation workstation may allow the seismic interpreter to scroll through adjacent slices through a 3D seismic image to visually track the continuity of a candidate geological boundary throughout the 3D image. Alternatively, the seismic interpretation workstation may allow the seismic interpreter to manually control the rotation of the view angle of the seismic image so it may be viewed from above, or from the East or from the West, or from intermediate directions.

As for the seismic interpretation system, the computer processor or processors and computer memory of the seismic interpretation workstation may be co-located with the seismic interpreter, while in other cases the computer processor and memory may be remotely located from the seismic interpreter, such as on "the cloud." In the latter case, the seismic or attribute images may only be displayed on a screen, including a laptop or tablet local to the seismic interpreter, who may interact with the computer processor via instructions sent over a network, including a secure network such as a virtual private network (VPN).

The interpreted seismic image may be used, together with other available information, to determine the location of the hydrocarbon reservoir (104) with a high degree of certainty. Further, the interpreted seismic image may be used to determine locations within a hydrocarbon reservoir (104) for which wellbores may be drilled, safely and economically, to produce the hydrocarbons.

Figure 4:
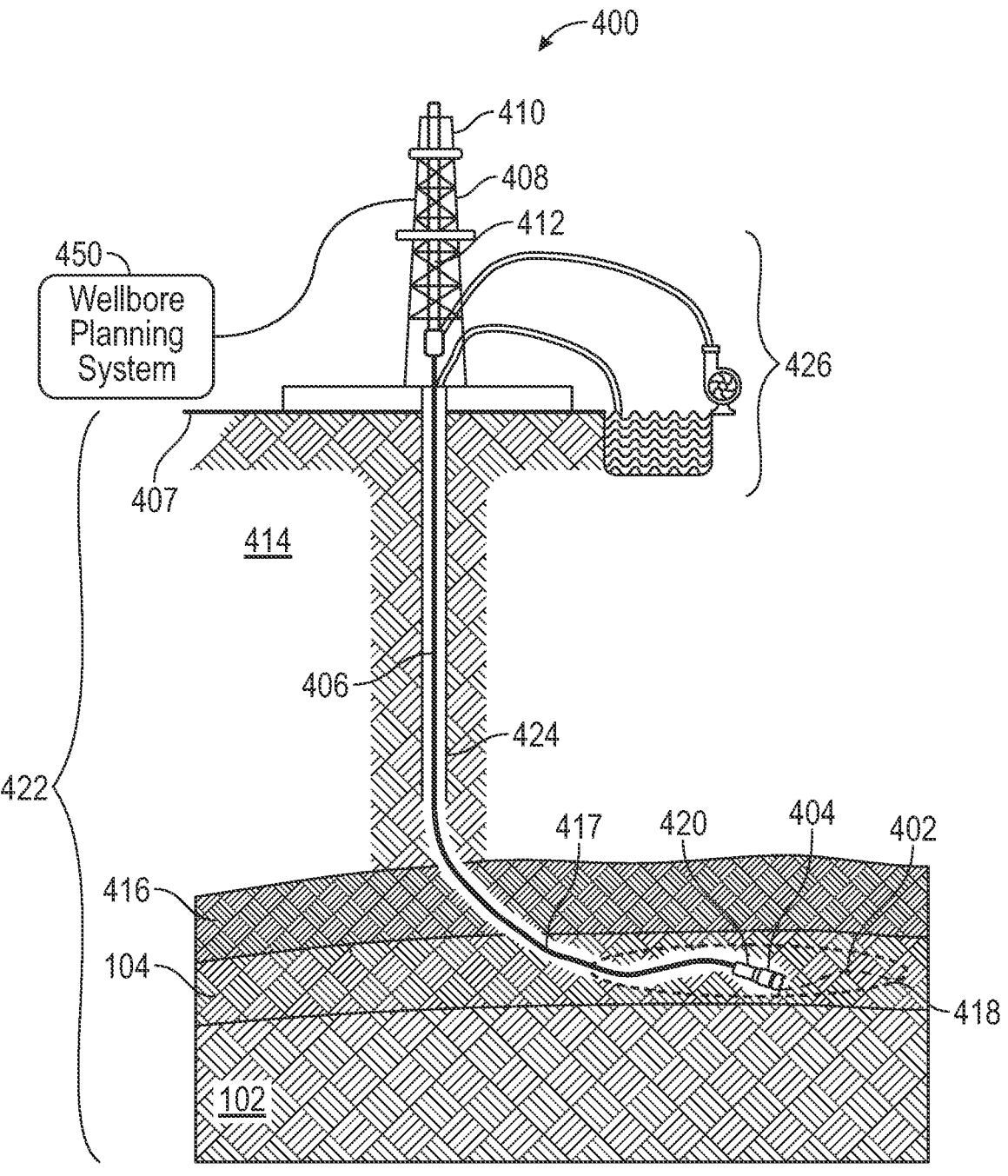
FIG. 4 shows a drilling system in accordance with one or more embodiments.

FIG. 4 shows a drilling system (400) in accordance with one or more embodiments. Although the drilling system (400) shown in FIG. 4 is used to drill a wellbore on land, the drilling system (400) may also be a marine wellbore drilling system. The example of the drilling system (400) shown in FIG. 4 is not meant to limit the present disclosure.

As shown in FIG. 4, a wellbore path (402) may be drilled by a drill bit (404) attached by a drillstring (406) to a drill rig located on the surface (407) of the earth. The drill rig may include framework, such as a derrick (408) to hold drilling machinery. The top drive (410) sits at the top of the derrick (408) and provides clockwise torque via the drive shaft (412) to the drillstring (406) in order to drill the wellbore. The wellbore may traverse a plurality of overburden (414) layers and one or more cap-rock (416) layers to a hydrocarbon reservoir (104) within the subterranean region (102). In accordance with one or more embodiments, the seismic image may be used to plan a wellbore including a wellbore path, (402) and drill a wellbore (417) guided by the wellbore path (402). The wellbore path (402) may be a curved wellbore path, or a straight wellbore path. All or part of the wellbore path (402) may be vertical, and some wellbore paths may be deviated or have horizontal sections.

Prior to the commencement of drilling, a wellbore plan may be generated. The wellbore plan may include a starting surface location of the wellbore, or a subsurface location within an existing wellbore, from which the wellbore may be drilled. Further, the wellbore plan may include a terminal location that may intersect with the target zone (418), e.g., a targeted hydrocarbon-bearing formation, and a planned wellbore path (402) from the starting location to the terminal location. In other words, the wellbore path (402) may intersect a previously located hydrocarbon reservoir (104).

Typically, the wellbore plan is generated based on best available information at the time of planning from a geophysical model, geomechanical models encapsulating subterranean stress conditions, the trajectory of any existing wellbores (which it may be desirable to avoid), and the existence of other drilling hazards, such as shallow gas pockets, over-pressure zones, and active fault planes.

The wellbore plan may include wellbore geometry information such as wellbore diameter and inclination angle. If casing (424) is used, the wellbore plan may include casing type or casing depths. Furthermore, the wellbore plan may consider other engineering constraints such as the maximum wellbore curvature ("dog-log") that the drillstring (406) may tolerate and the maximum torque and drag values that the drilling system (400) may tolerate.

A wellbore planning system (450) may be used to generate the wellbore plan. The wellbore planning system (450) may comprise one or more computer processors in communication with computer memory containing the geophysical and geomechanical models, information relating to drilling hazards, and the constraints imposed by the limitations of the drillstring (406) and the drilling system (400). The wellbore planning system (450) may further include dedicated software to determine the planned wellbore path (402) and associated drilling parameters, such as the planned wellbore diameter, the location of planned changes of the wellbore diameter, the planned depths at which casing (424) will be inserted to support the wellbore and to prevent formation fluids entering the wellbore, and the drilling mud weights (densities) and types that may be used during drilling the wellbore.

A wellbore (417) may be drilled using a drill rig that may be situated on a land drill site, an offshore platform, such as a jack-up rig, a semi-submersible, or a drill ship. The drill rig may be equipped with a hoisting system, such as a derrick (408), which can raise or lower the drillstring (406) and other tools required to drill the well. The drillstring (406) may include one or more drill pipes connected to form conduit and a bottom hole assembly (BHA) (420) disposed at the distal end of the drillstring (406). The BHA (420) may include a drill bit (404) to cut into subsurface (422) rock. The BHA (420) may further include measurement tools, such as a measurement-while-drilling (MWD) tool and logging-while-drilling (LWD) tool. MWD tools may include sensors and hardware to measure downhole drilling parameters, such as the azimuth and inclination of the drill bit, the weight-on-bit, and the torque. The LWD measurements may include sensors, such as resistivity, gamma ray, and neutron density sensors, to characterize the rock formation surrounding the wellbore (417). Both MWD and LWD measurements may be transmitted to the surface (407) using any suitable telemetry system, such as mud-pulse or wired-drill pipe, known in the art.

To start drilling, or "spudding in" the well, the hoisting system lowers the drillstring (406) suspended from the derrick (408) towards the planned surface location of the wellbore (417). An engine, such as a diesel engine, may be used to supply power to the top drive (410) to rotate the drillstring (406). The weight of the drillstring (406) combined with the rotational motion enables the drill bit (404) to bore the wellbore.

The near-surface is typically made up of loose or soft sediment or rock, so large diameter casing (424), e.g., "base pipe" or "conductor casing," is often put in place while drilling to stabilize and isolate the wellbore. At the top of the base pipe is the wellhead, which serves to provide pressure control through a series of spools, valves, or adapters. Once near-surface drilling has begun, water or drill fluid may be used to force the base pipe into place using a pumping system until the wellhead is situated just above the surface (407) of the earth.

Drilling may continue without any casing (424) once deeper, or more compact rock is reached. While drilling, a drilling mud system (426) may pump drilling mud from a mud tank on the surface (407) through the drill pipe. Drilling mud serves various purposes, including pressure equalization, removal of rock cuttings, or drill bit cooling and lubrication.

At planned depth intervals, drilling may be paused and the drillstring (406) withdrawn from the wellbore. Sections of casing (424) may be connected and inserted and cemented into the wellbore. Casing string may be cemented in place by pumping cement and mud, separated by a "cementing plug," from the surface (407) through the drill pipe. The cementing plug and drilling mud force the cement through the drill pipe and into the annular space between the casing and the wellbore wall. Once the cement cures, drilling may recommence. The drilling process is often performed in several stages. Therefore, the drilling and casing cycle may be repeated more than once, depending on the depth of the wellbore and the pressure on the wellbore walls from surrounding rock.

Due to the high pressures experienced by deep wellbores, a blowout preventer (BOP) may be installed at the wellhead to protect the rig and environment from unplanned oil or gas releases. As the wellbore becomes deeper, both successively smaller drill bits and casing string may be used. Drilling deviated or horizontal wellbores may require specialized drill bits or drill assemblies.

A drilling system (400) may be disposed at and communicate with other systems in the well environment. The drilling system (400) may control at least a portion of a drilling operation by providing controls to various components of the drilling operation. In one or more embodiments, the system may receive data from one or more sensors arranged to measure controllable parameters of the drilling operation. As a non-limiting example, sensors may be arranged to measure weight-on-bit, drill rotational speed (RPM), flow rate of the mud pumps (GPM), and rate of penetration of the drilling operation (ROP). Each sensor may be positioned or configured to measure a desired physical stimulus. Drilling may be considered complete when a target zone (418) is reached, or the presence of hydrocarbons is established.

Figure 5:
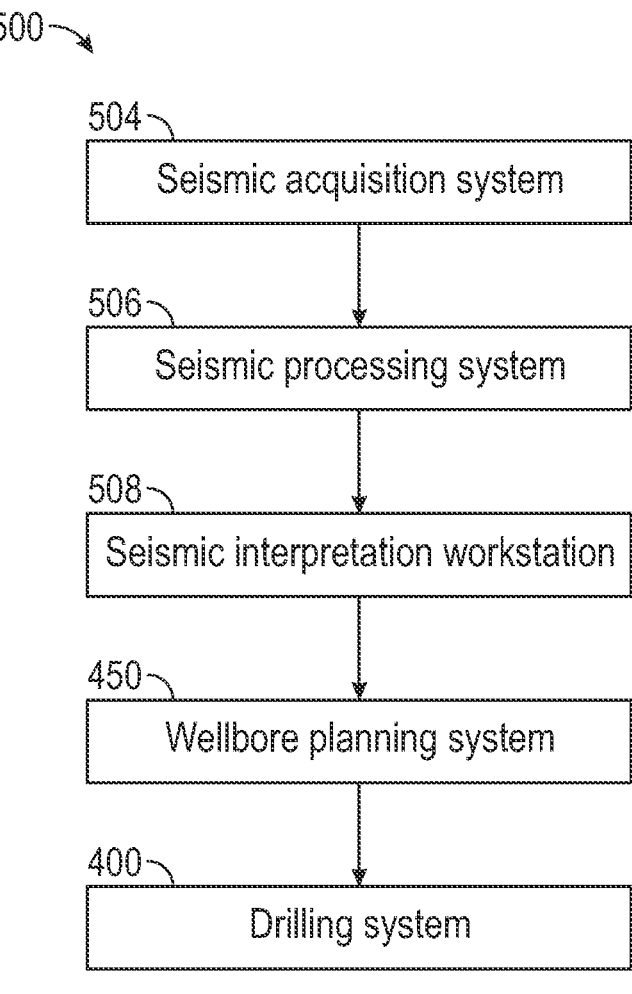
FIG. 5 shows a block diagram of systems in accordance with one or more embodiments.

FIG. 5 shows a block diagram of systems (500) in accordance with one or more embodiments. Each system may be coupled to one or more other systems within the series of systems (500). The seismic acquisition system (504) may also be configured to record a seismic dataset generated during a seismic survey (100) of a subterranean region (102), as previously described in FIG. 1. The seismic acquisition system (504) may be further configured to record more than one seismic dataset using more than one plurality of seismic receivers (120) and at least one seismic source. The recorded seismic dataset(s) may be physically transferred to the seismic processing system (506) in the form of tape readers or high-capacity hard drives.

The seismic processing system (506) may receive the seismic dataset(s) and may be used to process the seismic dataset(s). This may include processing steps such as pre-processing, noise attenuation (e.g., multiple attenuation), near-surface corrections, velocity analysis, migration (i.e., imaging), or attribute generation. In some embodiments, the seismic processing system (506) may be used to determine a seismic acquisition grid for a seismic survey, where the seismic acquisition grid includes at least one receiver grid and at least one source grid. The seismic processing system (506) may also be used to generate a velocity model. Further, the seismic processing system (506) may be used to form a seismic image based on the velocity model and the recorded seismic dataset(s). The seismic image may be transferred to a seismic interpretation workstation (508).

The seismic interpretation workstation (508) may be used to determine a location of a hydrocarbon reservoir (104) (or other subterranean features), based on the seismic image.

Knowledge of the location of the hydrocarbon reservoir (104) and other subterranean features may be transferred to a wellbore planning system (450). The wellbore planning system (450) may use information regarding the hydrocarbon reservoir (104) location to plan a well, including a wellbore path from the surface (407) of the earth to penetrate the hydrocarbon reservoir (104).

Information regarding the planned wellbore and wellbore path may be transferred to a drilling system (400), an example of which is described in FIG. 4. The drilling system (400) may drill the wellbore along the planned wellbore path to access and produce the hydrocarbon reservoir (104).

Figure 6:
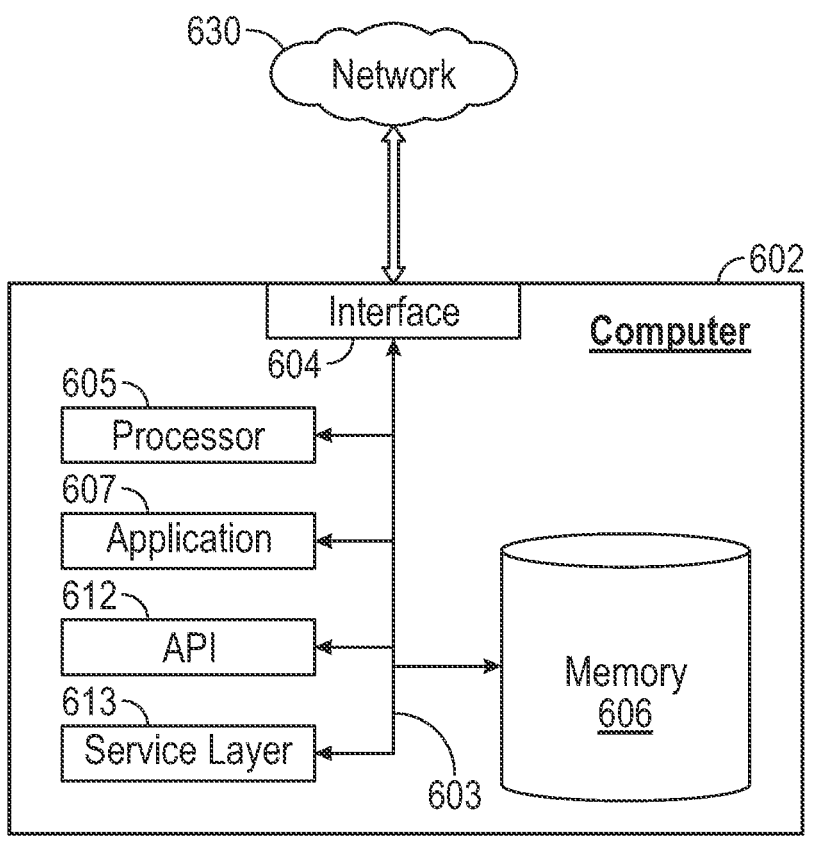
FIG. 6 shows a computer system in accordance with one or more embodiments.

Systems such as the seismic acquisition system (504), the seismic processing system (506), the seismic interpretation workstation (508), and the wellbore planning system (450), may all include or be implemented on one or more computer systems such as the one shown in FIG. 6.

FIG. 6 shows a computer system in accordance with one or more embodiments. The computer system is used to provide computational functionalities associated with described algorithms, methods, functions, processes, flows, and procedures as described in the present disclosure, according to one or more embodiments. The illustrated computer (602) is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer (602) may include a computer that includes an input device, such as a keypad, keyboard, touch screen, or other device that can accept user information, and an output device that conveys information associated with the operation of the computer (602), including digital data, visual, or audio information (or a combination of information), or a graphical user interface (GUI).

The computer (602) can serve in a role as a client, network component, a server, a database or other persistency, or any other component (or a combination of roles) of a computer system for performing the subject matter described in the instant disclosure. The illustrated computer (602) is communicably coupled with a network (630). For example, a generic computer (602), seismic processing system (506), and seismic interpretation workstation (508) may be communicably coupled using a network (630). In some implementations, one or more components of the computer (602) may be configured to operate within environments, including cloud-computing-based, local, global, or other environment (or a combination of environments).

At a high level, the computer (602) is an electronic computing device operable to receive, transmit, process, store, or manage data and information associated with the described subject matter. According to some implementations, the computer (602) may also include or be communicably coupled with an application server, e-mail server, web server, caching server, streaming data server, business intelligence (BI) server, or other server (or a combination of servers).

The computer (602) can receive requests over network (630) from a client application, for example, executing on another computer (602) and responding to the received requests by processing the said requests in an appropriate software application. For example, since seismic processing and seismic interpretation may be not be sequential, each computer (602) system may receive requests over a network (630) from any other computer (602) and respond to the received requests appropriately. In addition, requests may also be sent to the computer (602) from internal users (for example, from a command console or by other appropriate access method), external or third-parties, other automated applications, as well as any other appropriate entities, individuals, systems, or computers.

The computer (602) includes an interface (604). Although illustrated as a single interface (604) in FIG. 6, two or more interfaces (604) may be used according to particular needs, desires, or particular implementations of the computer (602). The interface (604) is used by the computer (602) for communicating with other systems in a distributed environment that are connected to the network (630). Generally, the interface (604) includes logic encoded in software or hardware (or a combination of software and hardware) and operable to communicate with the network (630). More specifically, the interface (604) may include software supporting one or more communication protocols associated with communications such that the network (630) or interface's hardware is operable to communicate physical signals within and outside of the illustrated computer (602).

The computer (602) also includes at least one computer processor (605). Although illustrated as a single computer processor (605) in FIG. 6, two or more processors may be used according to particular needs, desires, or particular implementations of the computer (602). Generally, the computer processor (605) executes instructions and manipulates data to perform the operations of the computer (602) and any algorithms, methods, functions, processes, flows, and procedures as described in the instant disclosure.

The computer (602) further includes a memory (606) that holds data for the computer (602) or other components (or a combination of both) that can be connected to the network (630). For example, memory (606) can be a database storing data consistent with this disclosure. Although illustrated as a single memory (606) in FIG. 6, two or more memories may be used according to particular needs, desires, or particular implementations of the computer (602) and the described functionality. While memory (606) is illustrated as an integral component of the computer (602), in alternative implementations, memory (606) can be external to the computer (602).

The application (607) is an algorithmic software engine providing functionality according to particular needs, desires, or particular implementations of the computer (602), particularly with respect to functionality described in this disclosure. For example, application (607) can serve as one or more components, modules, applications, etc. Further, although illustrated as a single application (607), the application (607) may be implemented as multiple applications (607) on the computer (602). In addition, although illustrated as integral to the computer (602), in alternative implementations, the application (607) can be external to the computer (602).

Each of the components of the computer (602) can communicate using a system bus (603). In some implementations, any or all of the components of the computer (602), both hardware or software (or a combination of hardware and software), may interface with each other or the interface (604) (or a combination of both) over the system bus (603) using an application programming interface (API) (612) or a service layer (613) or a combination of the API (612) and service layer (613). The API (612) may include specifications for routines, data structures, and object classes. The API (612) may be either computer-language independent or dependent and refer to a complete interface, a single function, or even a set of APIs.

The service layer (613) provides software services to the computer (602) or other components (whether illustrated or not) that are communicably coupled to the computer (602). The functionality of the computer (602) may be accessible for all service consumers using this service layer. Software services, such as those provided by the service layer (613), provide reusable, defined business functionalities through a defined interface. For example, the interface may be software written in JAVA, C++, or other suitable language providing data in extensible markup language (XML) format or another suitable format. While illustrated as an integrated component of the computer (602), alternative implementations may illustrate the API (612) or the service layer (613) as stand-alone components in relation to other components of the computer (602) or other components (whether or not illustrated) that are communicably coupled to the computer (602). Moreover, any or all parts of the API (612) or the service layer (613) may be implemented as child or submodules of another software module, enterprise application, or hardware module without departing from the scope of this disclosure.

There may be any number of computers (602) associated with, or external to, a computer system containing computer (602), wherein each computer (602) communicates over network (630). For example, one computer system may be specifically configured for seismic processing and denoted the seismic processing system (506). Another computer system may be specifically configured for seismic interpretation and denoted the seismic interpretation workstation (508). In some embodiments, seismic processing, such as steps 314-316 of FIG. 3, may be conducted using a first computer (602) and one or more first applications (607) while seismic interpretation, such as step 318 of FIG. 3, may be conducted on a second computer (602) using one or more second applications (607).

Further, the terms "client," "user," and other appropriate terminology may be used interchangeably as appropriate without departing from the scope of this disclosure. Moreover, this disclosure contemplates that many users may use one computer (602), or that one user may use multiple computers (602).

Although only a few example embodiments have been described in detail above, those skilled in the art will readily appreciate that many modifications are possible in the example embodiments without materially departing from this invention. Accordingly, all such modifications are intended to be included within the scope of this disclosure as limited only by the scope of the following claims.

What is claimed is:

1. A method comprising:

defining a first receiver grid for a wide-azimuth seismic survey over a subterranean region of interest, wherein the first receiver grid comprises a first plurality of receiver locations on a seafloor above the subterranean region of interest;

defining a second receiver grid for an ocean bottom node (OBN) seismic survey over the subterranean region of interest, wherein the second receiver grid comprises a second plurality of receiver locations on the seafloor, and wherein the second plurality of receiver locations is spatially dense relative to the first plurality of receiver locations;

deploying one seismic receiver among a first plurality of seismic receivers at each of the first plurality of receiver locations;

deploying one seismic receiver among a second plurality of seismic receivers at each of the second plurality of receiver locations;

activating a seismic source at a source location;

recording, using the first plurality of seismic receivers, a first seismic dataset that corresponds to the wide-azimuth seismic survey;

recording, using the second plurality of seismic receivers, a second seismic dataset that corresponds to the OBN seismic survey;

generating, using a velocity analysis method, a velocity model using the first seismic dataset;

forming a seismic image using the velocity model and the second seismic dataset; and determining a location of a hydrocarbon reservoir within the subterranean region of interest based on the seismic image.

2. The method of claim 1, further comprising planning a wellbore to penetrate the hydrocarbon reservoir based on the location, wherein the planned wellbore comprises a planned wellbore path.

3. The method of claim 2, further comprising drilling the wellbore guided by the planned wellbore path.

4. The method of claim 1, wherein at least one of the first plurality of seismic receivers is deployed using an autonomous underwater vehicle.

5. The method of claim 1, further comprising:

retrieving the first plurality of seismic receivers using an autonomous underwater vehicle; and repositioning one seismic receiver among the first plurality of seismic receivers at each of a third plurality of receiver locations using the autonomous underwater vehicle.

6. The method of claim 5, wherein the first receiver grid comprises the third plurality of receiver locations on the seafloor.

7. The method of claim 1, further comprising:

retrieving the first plurality of seismic receivers using an autonomous underwater vehicle; and downloading to a seismic processing system a portion of the first seismic dataset.

8. The method of claim 1, wherein the velocity analysis method comprises full waveform inversion.

9. A system comprising:

a seismic acquisition system comprising a first plurality of seismic receivers and a second plurality of seismic receivers, wherein a first receiver grid, for a wide-azimuth seismic survey over a subterranean region of interest, comprises a first plurality of receiver locations on a seafloor above the subterranean region of interest, wherein a second receiver grid, for an ocean bottom node (OBN) seismic survey over the subterranean region of interest, comprises a second plurality of receiver locations on the seafloor, wherein the second plurality of receiver locations is spatially dense relative to the first plurality of receiver locations, wherein one seismic receiver among the first plurality of seismic receivers is deployed at each of the first plurality of receiver locations, wherein the first plurality of seismic receivers is configured to record a first seismic dataset that corresponds to the wide-azimuth seismic survey, wherein one seismic receiver among the second plurality of seismic receivers is deployed at each of the second plurality of receiver locations, wherein the second plurality of seismic receivers is configured to record a second seismic dataset that corresponds to the OBN seismic survey, and a seismic source configured to activate at a source location;

a seismic processing system configured to:

receive, from the first plurality of seismic receivers, the first seismic dataset, receive, from the second plurality of seismic receivers, the second seismic dataset, generate, using a velocity analysis method, a velocity model using the first seismic dataset, and form a seismic image using the velocity model and the second seismic dataset; and a seismic interpretation workstation configured to:

determine a location of a hydrocarbon reservoir within the subterranean region based on the seismic image.

10. The system of claim 9, further comprising a wellbore planning system configured to plan a wellbore to penetrate the hydrocarbon reservoir based on the location, wherein the planned wellbore comprises a planned wellbore path.

11. The system of claim 10, further comprising a drilling system configured to drill the wellbore guided by the planned wellbore path.

12. The system of claim 9, wherein at least one of the first plurality of seismic receivers is deployed using an autonomous underwater vehicle.

13. The system of claim 9, further comprising an autonomous underwater vehicle configured to:

retrieve the first plurality of seismic receivers; and reposition one seismic receiver among the first plurality of seismic receivers at each of a third plurality of receiver locations.

14. The system of claim 9, further comprising an autonomous underwater vehicle configured to:

retrieve the first plurality of seismic receivers; and download, to the seismic processing system, a portion of the first seismic dataset.

* * * * *